(No Model.)
E. BERRY.
VEHICLE RUNNING GEAR.
No. 303,258. Patented Aug. 12, 1884.
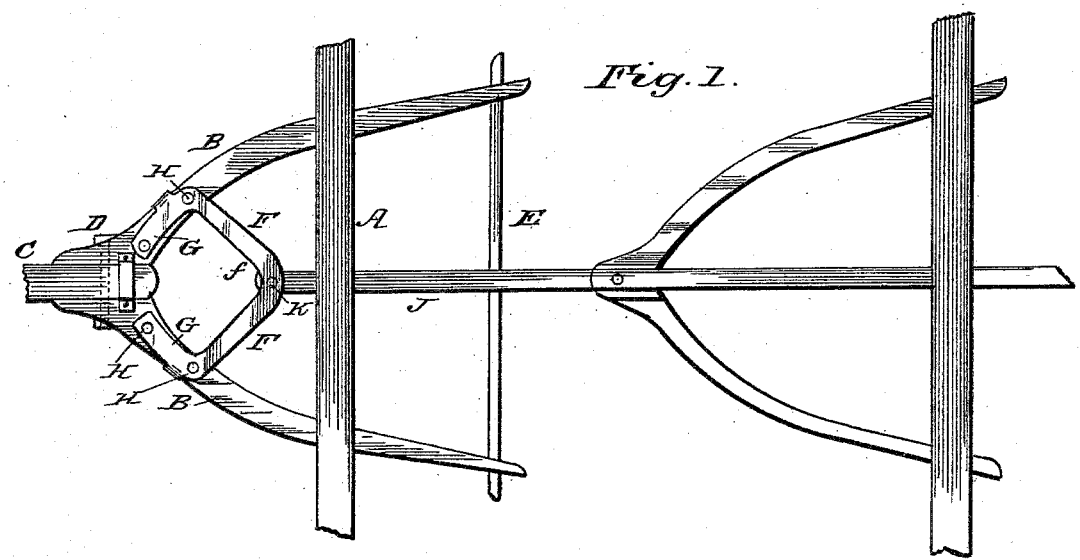
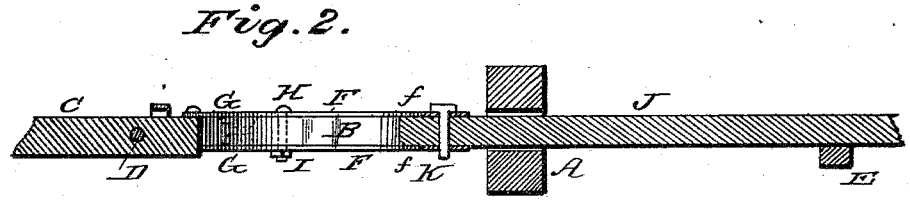
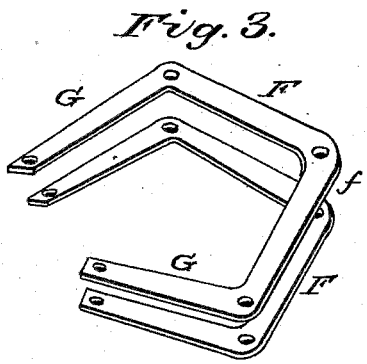
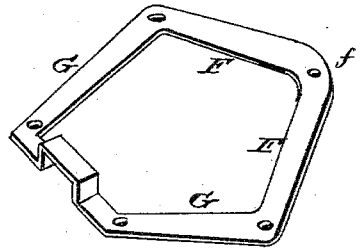
WITNESSES:
Fred. G. Dieterich
Arthur L. Morsell
Eurny Berry,
INVENTOR.
By Louis Bagger & Co.
ATTORNEYS.

UNITED STATES PATENT OFFICE.

EWING BERRY, OF HENDERSON, KENTUCKY.

VEHICLE RUNNING-GEAR.

SPECIFICATION forming part of Letters Patent No. 303,258, dated August 12, 1884.

Application filed March 29, 1884. (No model.)

*To all whom it may concern:*

Be it known that I, EWING BERRY, a citizen of the United States, and a resident of Henderson, in the county of Henderson and State of Kentucky, have invented certain new and useful Improvements in Running-Gear for Vehicles; and I do hereby declare that the following is a full, clear, and exact description of the invention, which will enable others skilled in the art to which it appertains to make and use the same, reference being had to the accompanying drawings, which form a part of this specification, and in which—

Figure 1 is a top or plan view of so much of the running-gear of a vehicle as is necessary to illustrate my improvement. Fig. 2 is a longitudinal sectional view of the same. Fig. 3 is a perspective detail view of the hound-plates in which the reach is coupled, and Fig. 4 illustrates a modified construction of the same.

Similar letters of reference indicate corresponding parts in all the figures.

My invention has relation to the running-gear of vehicles; and it consists in pivoting the forward end of the reach between plates which are bolted to opposite sides of the hounds, thereby relieving the tongue of undue strain, and dispensing with the king-bolt which is ordinarily used for the attachment of the front part of the reach to the front axle.

In the accompanying drawings, A denotes the front axle of a vehicle; B B, the hounds, and C the pole, which is hung upon the transverse bolt D, connecting the front ends of the hounds, the rear ends of which are connected by the usual brace, E. To the top and under side of the forward part of the hounds, between the rear end of the pole and the front axle, are bolted two plates of the configuration shown in the drawings, consisting of arms F, converging at *f* at about right angles to each other, and having bent arms G at their outer ends, which are shaped to fit the curvature of that part of the hounds to which they are fastened by bolts H. One of these plates is bolted to the upper side of the hounds, and another plate of precisely the same construction is bolted to the under side of the same, the pair of plates being connected to each other and fastened upon opposite sides of the hounds by the same bolts H and their nuts I, as will appear more clearly by reference to Fig. 2 of the drawings.

J denotes the reach, the forward end of which is inserted between the converging points *f* of the pair of plates F, and fastened thereto, movably, by the bolt K. Thus it will be seen that the reach is free to move or swing upon bolt K in turning corners with the vehicle, and as the point of attachment K is some distance back of the point where the tongue or pole is hung to the hounds the reach is permitted to swing or move in a smaller arc than would otherwise be the case, equally independent both of the pole and of the front axle. It will further be seen that the plates F G, besides forming means of attachment for the reach, operate to brace and strengthen the hounds at the point where these are subjected to the greatest strain, thus greatly increasing the durability and wearing qualities of that part of the vehicle.

Having thus described my invention, I claim and desire to secure by Letters Patent of the United States—

The combination, in the running-gear of a vehicle, of the hounds B B, plates F G, bolted to the upper and under side of the hounds, tongue or pole C, bolt K, inserted through the plates, and reach J, inserted with its forward end between the tongue-plates, and pivoted to the same by the bolt K in a line with the inner end of the tongue, substantially as and for the purpose herein shown and specified.

In testimony that I claim the foregoing as my own I have hereunto affixed my signature in presence of two witnesses.

EWING BERRY.

Witnesses:
M. McKAY,
ROBT. POSEY.